(12) United States Patent
Kihara et al.

(10) Patent No.: US 7,159,074 B2
(45) Date of Patent: Jan. 2, 2007

(54) DATA STORAGE SYSTEM

(75) Inventors: Kenichi Kihara, Yokohama (JP); Toshihiko Fukuda, Yokohama (JP); Masahide Sato, Noda (JP)

(73) Assignee: Hitachi, Ltd., Tokyo (JP)

( * ) Notice: Subject to any disclaimer, the term of this patent is extended or adjusted under 35 U.S.C. 154(b) by 188 days.

(21) Appl. No.: 10/884,227

(22) Filed: Jul. 2, 2004

(65) Prior Publication Data

US 2004/0255080 A1 Dec. 16, 2004

(30) Foreign Application Priority Data

Apr. 12, 2004 (JP) .............................. 2004-116988

(51) Int. Cl.
*G06F 12/00* (2006.01)
(52) U.S. Cl. ........................ 711/114; 711/100; 711/114; 711/112; 711/161; 711/162; 711/204
(58) Field of Classification Search ...................... None
See application file for complete search history.

(56) References Cited

U.S. PATENT DOCUMENTS

| | | | |
|---|---|---|---|
| 6,513,101 B1 | 1/2003 | Fisher et al. | |
| 6,779,095 B1 | 8/2004 | Selkirk et al. | |
| 6,789,161 B1 | 9/2004 | Blendermann et al. | |
| 6,961,817 B1 | 11/2005 | Soejima et al. | |
| 2002/0091828 A1 | 7/2002 | Kitamura et al. | |
| 2002/0103969 A1* | 8/2002 | Koizumi et al. | 711/114 |
| 2004/0044845 A1 | 3/2004 | Gibble et al. | |
| 2004/0268038 A1 | 12/2004 | Nagasoe et al. | |
| 2005/0055211 A1 | 3/2005 | Claudatos et al. | |
| 2005/0097260 A1* | 5/2005 | McGovern et al. | 711/100 |

* cited by examiner

*Primary Examiner*—Sanjiv Shah
*Assistant Examiner*—Midys Rojas
(74) *Attorney, Agent, or Firm*—Townsend and Townsend and Crew LLP

(57) ABSTRACT

When replacing a disk device that has passed over a warranty expiration date with a new disk device, data necessary to be stored thereafter among the data that is recorded in the device must be transferred to another disk device, to thereby require a time for processing. A storage system includes: a storage device having a plurality of disk drives that stores data; and a data storage managing device which is connected to the storage device and has a data storage managing module that manages the storage of the data in the storage device, in which the data storage managing module compares a retention date of the data to be stored with a warranty expiration date of the disk drive, selects a disk drive that stores the data as the result of the comparison, and stores the data in the selected disk drive.

20 Claims, 19 Drawing Sheets

FIG.2B

DRIVE DEVICE INFORMATION

| DRIVE NUMBER | WARRANTY EXPIRATION DATE | TOTAL CAPACITY | FREE CAPACITY |
|---|---|---|---|
| drive#1 | 2004.8 | 100MB | 90MB |
| drive#2 | 2005.8 | 120MB | 100MB |
| drive#3 | 2006.8 | 100MB | 60MB |

FIG.2C

STORED DATA MANAGING INFORMATION

| DATA ID | STORAGE DRIVE | RETENTION DATE | SIZE |
|---------|---------------|----------------|------|
| D1 | drive#1 | 2004.4 | 10MB |
| D2 | drive#3 | 2008.10 | 40MB |
| D3 | drive#2 | 2005.10 | 20MB |

FIG.10B

STORED DATA MANAGING INFORMATION

| DATA ID | STORAGE LDEV | RETENTION DATE | SIZE |
|---------|--------------|----------------|------|
| D1 | L1 | 2004.4 | 20MB |
| D2 | L2 | 2008.10 | 10MB |
| D3 | L3 | 2005.10 | 5MB |

FIG.11A

PARITY GROUP INFORMATION

| PARITY GROUP NUMBER | WARRANTY EXPIRATION DATE | TOTAL CAPACITY | FREE CAPACITY | DISK DRIVE NUMBER |
|---|---|---|---|---|
| P0 | 2004.9 | 100MB | 75MB | 1, 2, 3, 4 |
| P1 | 2005.9 | 120MB | 120MB | 5, 6, 7, 8 |
| P2 | 2006.9 | 100MB | 90MB | 9, 10, 11, 12 |

FIG.11B

LDEV MANAGING INFORMATION

| LDEV NUMBER | ASSIGNMENT PARITY GROUP | ASSGNMENT CAPACITY |
|---|---|---|
| L1 | P0 | 20MB |
| L2 | P1 | 10MB |
| L3 | P0 | 5MB |

# DATA STORAGE SYSTEM

CLAIM OF PRIORITY

The present application claims priority from Japanese application P2004-116988 filed on Apr. 12, 2004, the content of which is hereby incorporated by reference into this application.

BACKGROUND

It is related with a storage system, and more particularly to a data storage system that properly selects a physical drive in which data is stored.

In recent years, the amount of data that is dealt with in a computer system has been remarkably increasing. In order to record a large amount of data, a disk array system is widely employed. A disk array system is an assembly of a plurality of disk drives and has the features that the capacity is large, and the performance, the reliability, and the availability are high.

Also, in recent years, a Fibre Channel (FC) has appeared as an interface between a host computer and a peripheral device such as a disk device. As a result, it becomes easy that a plurality of host computers and a plurality of storage devices are connected to each other through FC cables to structure a computer system. With this structure, data is commonly used between the respective host computers, and a network load can be reduced as compared with the conventional structure.

As described above, in a system where a large number of disk drives are connected to each other, when data is stored, it is necessary to assign the disk drive in which the data is stored.

JP 2001-142648 A discloses a method of assigning a disk drive in which data is recorded according to a required capacity, performance, reliability, or the like.

SUMMARY

In a system including a large number of disk drives as described above, each of the disk drives has a set warranty period. In order to prevent the data disappearance due to the failure of a disk drive, it is necessary that a disk drive that has gone over the warranty period be removed rapidly and replaced with a new disk drive. In this situation, data to be stored in the new disk drive among the data that has been stored in the original disk drive has to be copied to another disk drive. Such a copy delays a time required for replacement of the disk drive, consumes a hardware resource, and adversely affects another affair. Accordingly, it is desirable to appropriately arrange the data in advance so as to reduce the number of times of copying the data.

According to the present invention, there is provided a storage system including: a storage device having a plurality of disk drives that stores data; and a data storage managing device which is connected to the storage device and has a data storage managing module that manages the storage of the data in the storage device, in which the data storage managing module compares a retention date of the data to be stored with a warranty expiration date of the disk drive, selects a disk drive that stores the data at the result of the comparison, and stores the data in the selected disk drive.

According to the present invention, it is possible that data be appropriately arranged within the storage device, and the hardware resource be effectively used.

BRIEF DESCRIPTION OF THE DRAWINGS

FIGS. 2A to 2C are explanatory diagrams of data and so on which are recorded in a memory.

FIGS. 10A and 10B are explanatory diagrams of data and so on which are recorded in a memory of the data storage managing device according to this embodiment.

FIGS. 11A and 11B are explanatory diagrams of data and so on which are recorded in a memory of a storage subsystem according to this embodiment.

DETAILED DESCRIPTION OF THE PREFERRED EMBODIMENTS

Now, a description will be given in more detail of preferred embodiments of the present invention with reference to the accompanying drawings.

Figure 1:
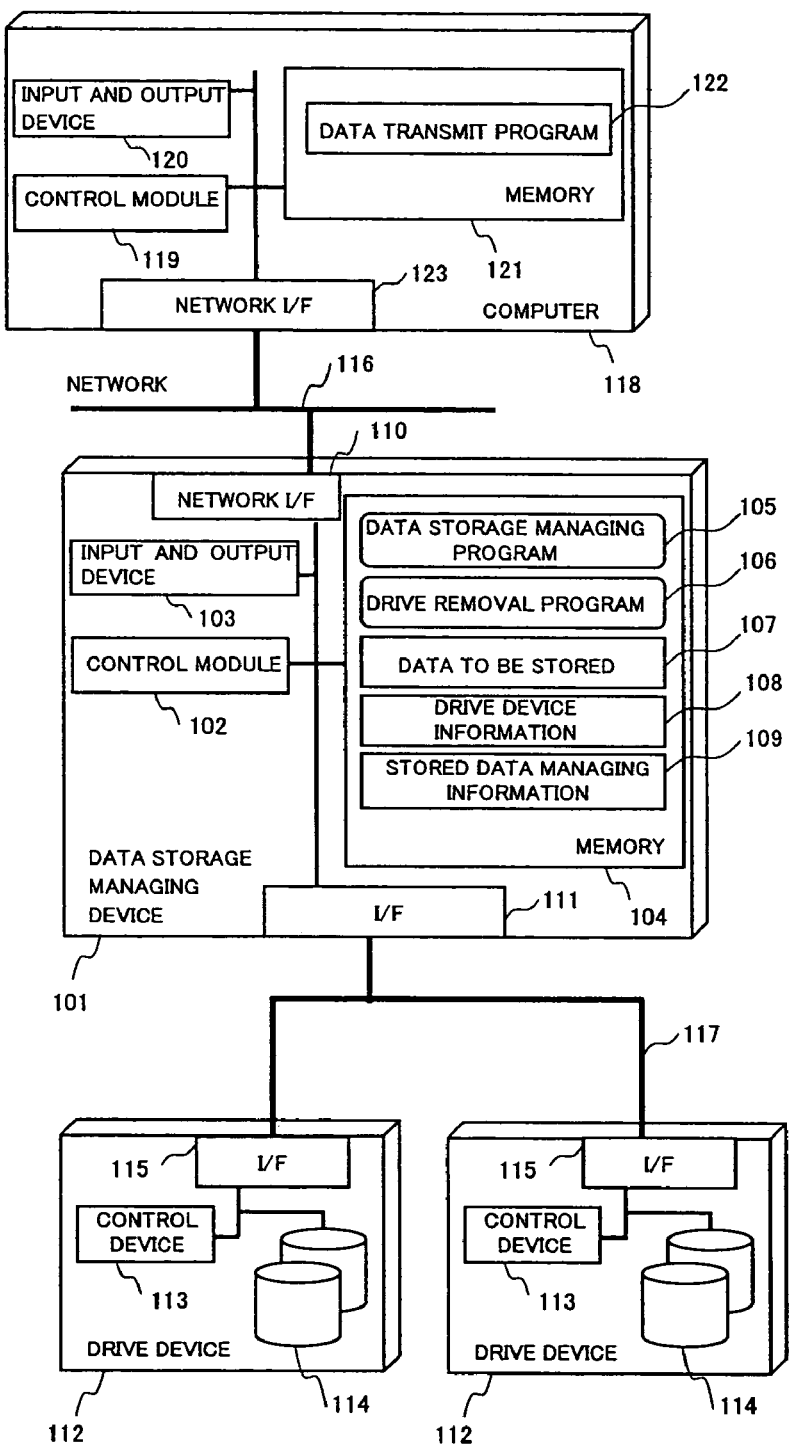
FIG. 1 is a block diagram of a storage system according to a first embodiment of the present invention.

FIG. 1 is a block diagram showing a storage system according to a first embodiment of the present invention.

The storage system shown in FIG. 1 is made up of a data storage managing device 101, a plurality of drive devices 112, and a cable 117 that connects those devices to each other. The storage system is connected to another computer 118 so as to communicate with the computer 118 through a network 116.

The data storage managing device 101 includes: a control module (CPU) 102 that executes various programs which are recorded in a memory 104; an input and output device 103 that is used by a user to input and output information; the memory 104 in which various programs, data, and information are recorded; an interface (I/F) 111 that controls communication with each of the drive devices 112; and a network interface (I/F) 110 that controls communication which is conducted with the computer 118 through the network 116.

The memory 104 records a data storage managing program 105, a drive removal program 106, a data to be stored 107, a drive device information 108, and a stored data managing information 109. They will be described in detail with reference to FIGS. 2 to 4.

Each of the drive devices 112 includes: a disk drive 114 that stores data; an interface 115 that communicates with the data storage managing device 101; and a control device 113 that controls the operation of those devices.

The network 116 is, for example, an LAN, and connected with another computer (not shown).

The cable 117 may be formed of a metal cable or an optical fiber, and connects the data storage managing device 101 and the drive devices 112. Communication using a protocol such as an SCSI or a Fibre Channel (FC) is conducted through the cable 117. The data storage managing device 101 and the drive devices 112 may be connected directly to each other with the cable 117 as a transmission medium, or connected through a network.

The computer 118 includes: a control module (CPU) 119 that executes a program which is recorded in the memory 104; an input and output device 120 that is used by a user to input and output information; a memory 121 in which various programs, data, and information are recorded; and a network interface (I/F) 123 that controls communication which is conducted with the data storage managing device 101 through the network 116.

The memory 121 stores at least a data transmit program 122. The data transmit program 122 transmits the data to be recorded in the drive devices 112 to the data storage managing device 101. The transmission may be conducted by a data unit or a batch process.

The computer 118 is, for example, an E-mail server. In this case, the memory 121 records a program (not shown) which realizes a function as the E-mail server. Also, the data which is transmitted by the data transmit program 122 is, for example, an E-mail Archive.

Also, the data storage managing device 101 may provide a function as the computer 118. That is, the data storage managing device 101 may be a computer (computing machine) to indicate write and read of data with respect to the disk drives 114 to the drive devices 112. For example, a program (not shown) that realizes a function as the E-mail server is recorded in the memory 104 of the data storage managing device 101, and when the control module 102 executes the program which is recorded in the memory 104, the data storage managing device 101 realizes a function as the data storage managing device that manages the storage of the data which is obtained from another computer connected to the network 116, and a function as the E-mail server.

Also, when another program is recorded in the memory 104 and executed by the control module 102, the data storage managing device 101 can realize the functions except the function as the E-mail server. Also, it is possible that hardware necessary to realize those functions be added to the data storage managing device 101. In this manner, the data storage managing device 101 can provide the functions except the function as the data storage managing device by addition of appropriate hardware and software.

Figure 2A:
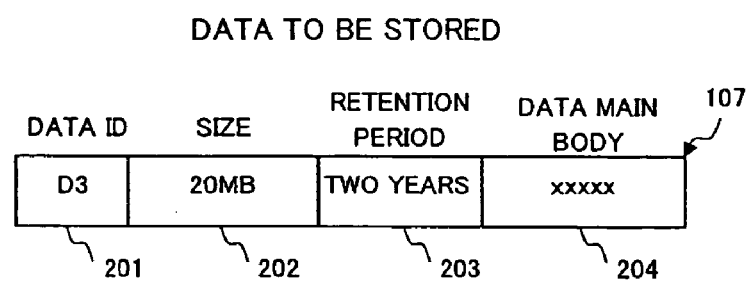

FIGS. 2A to 2C are explanatory diagrams of data and so on which are recorded in the memory 104.

FIG. 2A is an explanatory diagram of the data to be stored 107.

The data to be stored 107 is data which is temporarily stored in the memory 104, and is made up of a data ID 201, a data size 202, a retention period 203, and a data main body 204.

The data ID 201 is an identifier assigned to identify data which are recorded in the drive devices 112, and is uniquely determined in the drive device 112 which is managed by the data storage managing device 101.

The data size 202 is a data size of the data to be stored 107, and structured by 20 MB (megabyte) in an example shown in FIGS. 2A to 2C.

The retention period 203 is a term during which the data has to be stored in the drive devices 112 after the data has been recorded in the drive devices 112. The term may be determined by the computer, application software, an OS, or a user that produces that data. Also, the data storage managing program 105 may determine the term according to a policy that decides the retention period 203 depending on the kind of data or the kind of application software that prepares the data. For example, in the case where E-mail data is stored, the retention period 203 is set to one year. In the example shown in FIGS. 2A to 2C, the retention period 203 is set to two years.

The data main body 204 is data that is prepared by another computer (not shown) which is connected to the network 116 and obtained to be stored in the drive devices 112 by the data storage managing program 105. The data main body 204 is a file such as a document or an E-mail. Also, the data main body 204 may be data that another computer requires the data storage managing device 101 that data be stored in the drive devices 112.

FIG. 2B is an explanatory diagram of the drive device information 108.

The drive device information 108 is made up of a drive number 205, a warranty expiration date 206, a total capacity 207, and a free capacity 208, the information being provided in each of the drive devices 112.

The drive number 205 is an identifier that is uniquely assigned to identify the respective disk drives 114 which are disposed in the drive devices 112.

The warranty expiration date 206 is a warranty expiration date of the respective disk drives 114 disposed in the drive devices 112, and is determined according to a warranty period which is determined by a manufacturer of the disk drives 114, application conditions of the disk drives 114, and so on. It is necessary that the disk drive 114 that has passed over the warranty expiration date 206 be rapidly removed and replaced with a new disk drive 114. It is possible that the warranty expiration date be not set in each of the disk drives 114 but set with each of the drive devices 112 as a unit.

The total capacity 207 is a total amount of data which can be stored in each of the disk drives 114.

The free capacity 208 is a capacity of unused data storage region of a disk drive 114, and a value obtained by subtracting the amount of data that has been already stored in the disk drive 114 from the total capacity 207.

The drive device information 108 is initialized by the user through the input and output device 103 when each of the disk drives 114 is connected to the data storage managing device 101. Then, the drive device information 108 is referred to by the data storage managing program 105 and the drive removal program 106.

Also, it is possible that the manufacturer of each of the disk drives 114 record the disk drive information including the warranty period, capacity, and so on of the disk drive 114 in a ROM or the like (not shown) within each of the disk drives 114 at the time of factory shipment, the data storage managing program 105 and so on read the information and set the warranty expiration date 206 and the total capacity 208 on the basis of the read information. In this case, for example, the warranty expiration date 206 and the total capacity 208 are set in the following procedure.

First, the data storage managing program 105 issues a disk drive information transmit request to the control device 113 of each drive device.

The control device 113 includes at least a CPU (not shown) and a memory (not shown), the memory records at least a drive device information notifying program (not shown), and the CPU executes the program that is recorded in the memory.

Subsequently, the drive device information notifying program reads the disk drive information from the ROM of the disk drive 114, calculates the values of the warranty expiration date 206 and the total capacity 208, and returns the calculated values to the data storage managing program 105. Then, the data storage managing program records the received warranty expiration date 206 and total capacity 208 in the drive device information 108.

In the case where one drive device 112 includes a plurality of disk drives 114, the warranty expiration date 206 which is returned to the data storage managing program 105 by the drive device information notifying program is, for example, the earliest date of the warranty expiration dates 206 which are calculated for the respective disk drives 114. Also, in this case, the total capacity 208 is a total value of the capacities of the respective disk drives 114.

Also, the drive device information notifying program may return the read disk drive information to the data storage managing program 105. In this case, the data storage managing program 105 calculates the warranty expiration date 206 and the total capacity 208 according to the disk drive information.

FIG. 2C is an explanatory diagram of the stored data managing information.

The stored data managing information is made up of a data ID 209, a storage drive 210, a retention date 211, and a data size 212.

The data ID 209 is an identifier that is assigned to identify the data which are recorded in the drive devices 112, and the data ID 201 that has been explained with reference to FIG. 2A is recorded as it is.

The storage drive 210 is a drive number of the disk drive 114 in which the data is stored, and is equal to the drive number 205.

The retention date 211 is a time at which a retention period 1003 elapses from the data storage time. The data that does not achieve the retention date 211 must not be deleted or changed.

The data size 212 is a data size of the data to be stored 107, and the data size 202 that has been explained with reference to FIG. 2A is recorded as it is.

The stored data managing information 109 is prepared by the data storage managing program 105 and is referred to by the drive removal program 106.

Figure 3:
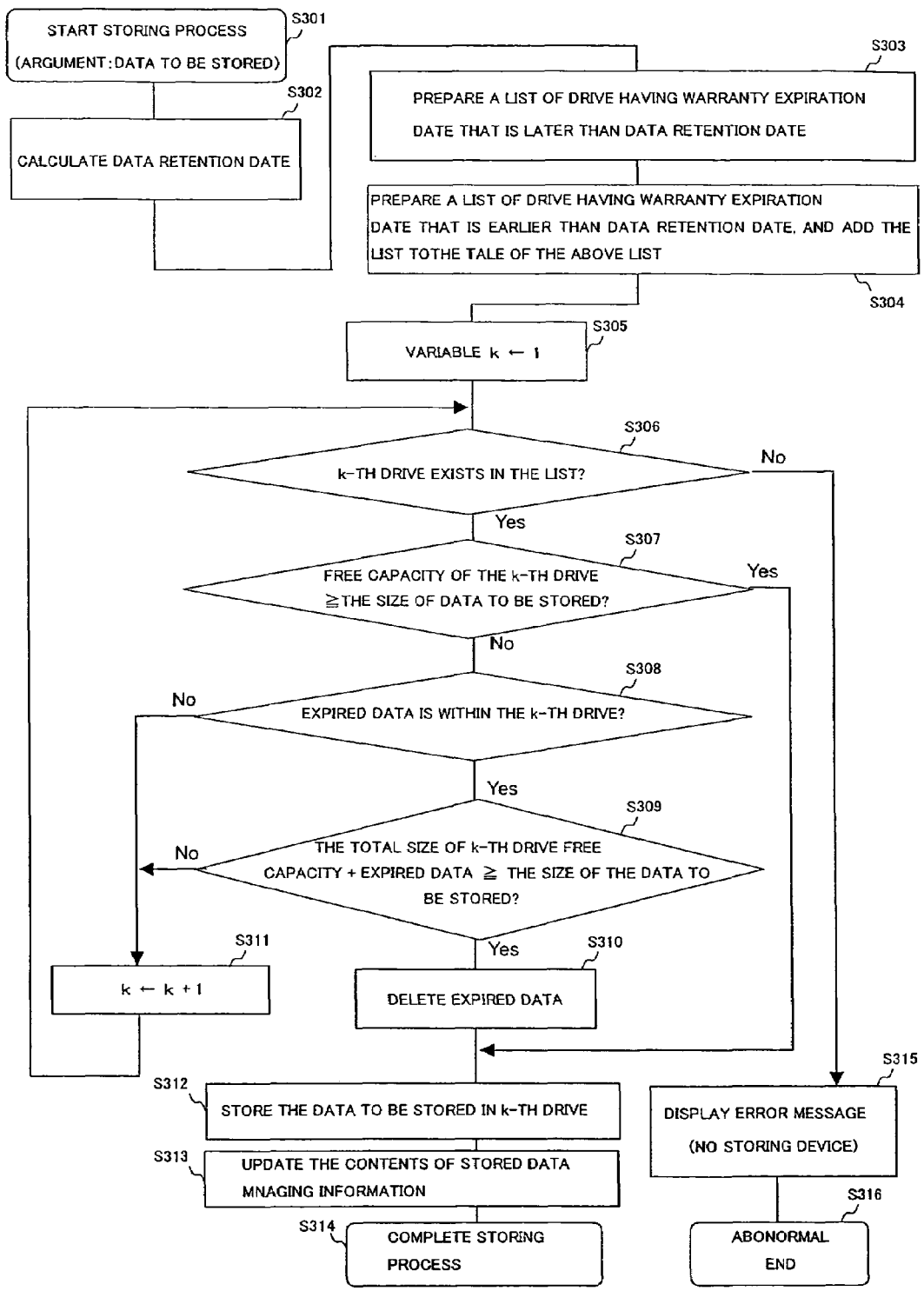
FIG. 3 is a flowchart of a data storing process which is executed by a data storage managing program.

FIG. 3 is a flowchart of a data storing process which is executed by the data storage managing program 105.

The data storage managing program 105 is a program that manages the storage of the data in each of the drive devices 112, and is executed by the control module 102. The data storage managing program 105 obtains the data to be stored in each of the drive devices 112 from another computer (not shown) through the network 116, and temporarily stores the data in the memory 104 as the data to be stored 107. Also, the data storage managing program 105 selects any drive device 112, and stores the data to be stored 107 in the selected drive device 112.

When a data storage request is received with the data to be stored 107 as an argument, the storing process starts (S301). Then, the retention date 211 is calculated according to the retention period 203 of the data and the present date (S302).

Subsequently, the disk drive 114 having the warranty expiration date 206 that is later than the retention date 211 is selected from the drive device information 108 to specify the drive number 205. A list in which the drive numbers 205 are arranged in the order that the warranty expiration dates 206 are earlier is prepared (S303). In addition, in the remaining disk drives 114 (the disk drives each having the warranty expiration date 206 that is earlier than the retention date 211), a list in which the drive numbers 205 are arranged in the order that the warranty expiration dates 206 are later is prepared, and this list is added to the tale of the list which is prepared in the step S303 (S304).

Then, an initialization is conducted with the value of a variable k as 1 (S305). In this example, the variable k is a counter which is used to sequentially read the information in the lists prepared in the steps S303 and S304.

Then, the drive number 205 which is k-th from the head of the list is searched (S306). In the case where the k-th drive number 205 is not found, the disk drive 114 that is to store the data does not exist. Consequently, an error message that is indicative of no disk drive in which the data is to be stored is displayed (S315) to abnormally end the storing process without storing the data (S316).

On the other hand, in the case where the k-th drive number 205 is found, the free capacity 208 that corresponds to the drive number 205 is searched from the drive device information 108, and is compared with the data size 202 of the data to be stored 107 (S307). In the case where the free capacity 208 is larger than the data size 202 or equal to the data size 202, the data can be stored in the k-th disk drive 114. Consequently, processing advances to a step S312 which will be described later.

On the other hand, in the case where the free capacity 208 is smaller than the data size 202, in order to ensure the capacity that stores the data to be stored 107, the data that has already passed over the retention date 211 is searched with reference to the retention date 211 of the data which is stored in the disk drive 114 from the stored data managing information 109 (S308). In the case where no data that has already passed over the retention date 211 is found, the data to be stored 107 cannot be stored in the disk drive 114. Consequently, the variable k is incremented by one (S311), and processing returns to the step S306 for examining a subsequent disk drive.

On the other hand, in the case where expired data that has already passed over the retention date 211 is found, a total of the data sizes 212 of all of the found data and the free capacity 208 are calculated and compared with the data size 202 of the data to be stored 107 (S309). In the case where the data size 202 is larger than the calculated total capacity or equal to the calculated total capacity, the data to be stored 107 cannot be stored in the disk drive 114. Consequently, the variable k is incremented by one (S311), and processing returns to the step S306 for examining the subsequent disk drive. On the other hand, in the case where the data size 202 is smaller than the calculated total capacity, all of the expired data which has been found is deleted, and a capacity that stores the data to be stored 107 is ensured (S310).

Then, the data to be stored 107 is stored in the k-th disk drive 114 (S312), update that information on data which is newly stored is added to the stored data managing information 109 is made (S313), and the storing process is completed (S314).

According to the processing shown in FIG. 3, the disk drive 114 having the warranty expiration date 206 that is later than the retention date 211 of the data to be stored 107 is selected, and the data to be stored 107 is stored in the selected disk drive 114. For that reason, when the warranty expiration date 206 of the disk drive 114 has elapsed, and the disk drive 114 is removed, the data that is stored in the disk drive 114 does not need to move to another disk drive 114, thereby making it possible to reduce the amount of processing necessary for removing the disk drive.

Also, because the disk drive 114 having the earliest warranty expiration date 206 is selected from the disk drives 114 having the warranty expiration dates 206 which are later than the retention date 211 of the data to be stored 107, and the data is stored in the selected disk drive 114, the drive device 112 having the later warranty expiration date 206 can be assigned to data having the later retention date 211.

Also, in the case where no disk drive 114 having the warranty expiration date that is later than the retention date 211 of the data to be stored 107 is found, the disk drive 114 having the latest warranty expiration date is selected. Therefore, it is possible to reduce the transfer of the data necessary for removing the disk drive 114.

Figure 4:
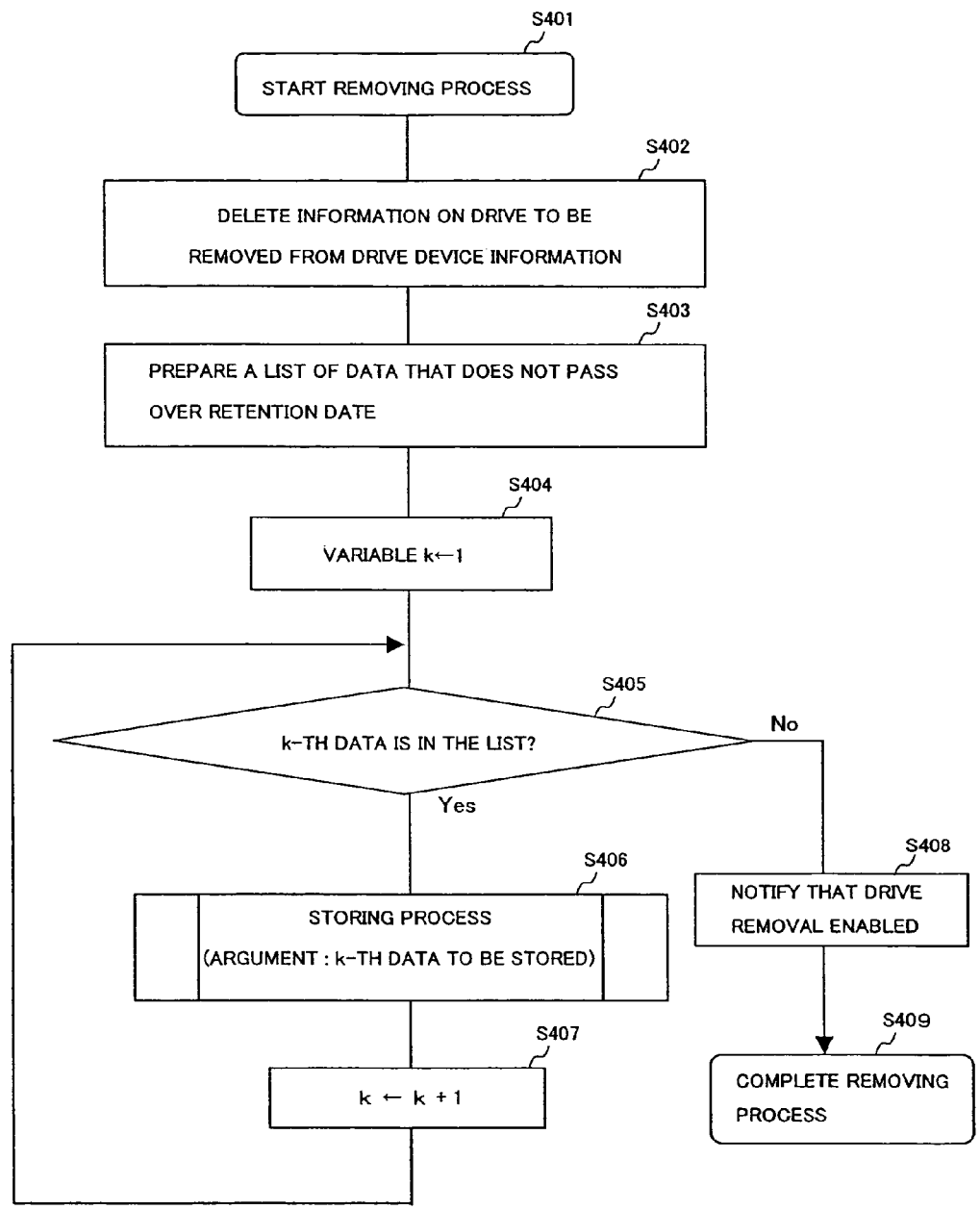
FIG. 4 is a flowchart of a drive removing process which is executed by a drive removal program.

FIG. 4 is a flowchart of a drive removing process which is executed by the drive removal program 106.

The drive removal program 106 is a program which is executed by the control module 102 and conducts a process necessary for removing the drive device 112 that has passed over the warranty expiration date (or approaches the warranty expiration date).

When the drive removing process starts (S401), the information on the disk drive 114 to be removed is first deleted from the drive device information 108 (S402).

Then, the data that is stored in the disk drive 114 and has not yet passed over the retention date 211 is searched from the stored data managing information 109, and a list of those data is prepared (S403).

Then, an initialization is conducted with the value of the variable k as 1 (S404). In this example, the variable k is a counter that counts up the listed data.

Then, the k-th data is searched from the list. In the case where the k-th data is not found, it is judged that the removal of the disk drive 114 is enabled because the transfer of all of the data to be transferred has been completed, or there exists no data that needs to be transferred. The input and output device 103 is notified of the judgment (S408), and the drive removing process is completed (S409).

On the other hand, in the case where the k-th data is found, a data storage request with the k-th data to be stored as an argument is transmitted to the data storage managing program 105, to thereby execute the data storing process (FIG. 3) (S406).

Then, the variable k is incremented by one (S407), and processing returns to the step S405 for conducting subsequent data processing.

Figure 5:
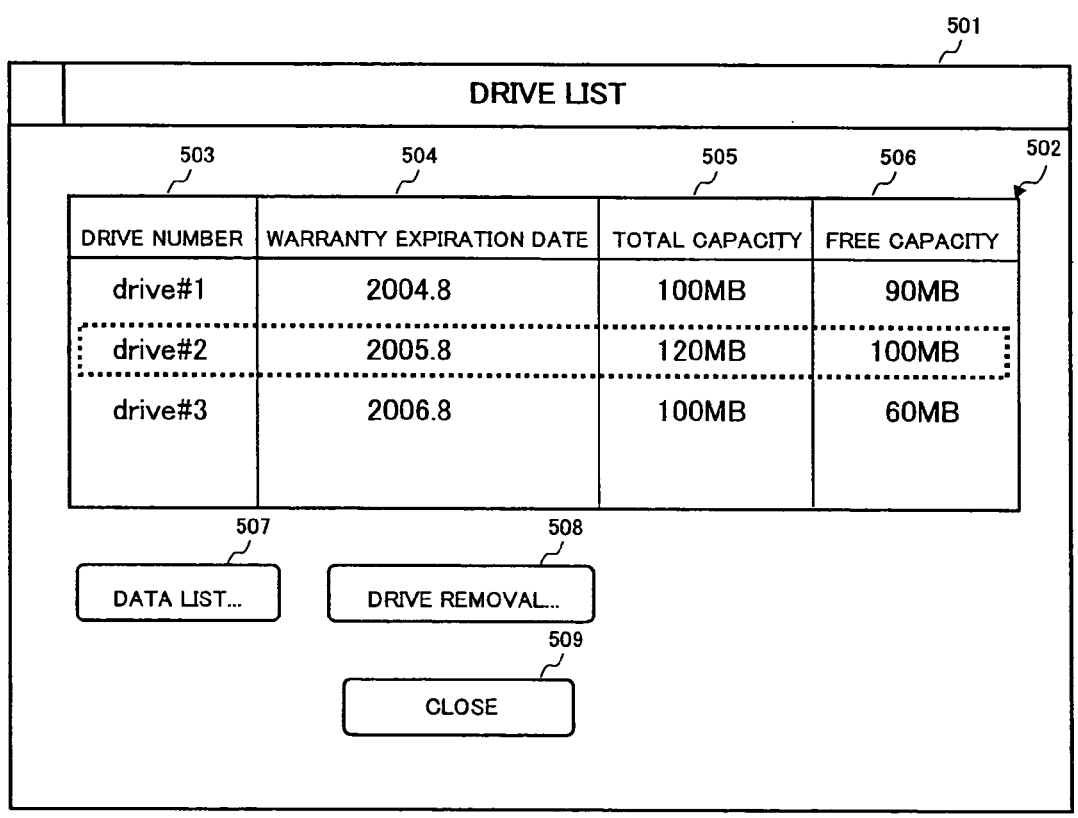
FIG. 5 is an explanatory diagram of a display screen of an input and output device of the data storage managing device.

FIG. 5 is an explanatory diagram of a screen that is displayed on the input and output device 103 of the data storage managing device 101.

The input and output device 103 according to this embodiment includes a screen display device (not shown) and a pointing device (not shown) such as a mouse. In addition, the input and output device 103 may include a keyboard (not shown) through which a character can be inputted. Also, the input and output device 103 applies a graphical user interface (GUI) which can input information by indication and operation by a mouse cursor to improve the convenience.

A drive list window 501 is displayed on the screen of the input and output device 103, and a drive list 502, a data list display button 507, a drive removal button 508, and a window close button 509 are displayed on the window.

The drive list 502 displays the contents of the drive device information 108. More particularly, the drive table 502 is made up of a drive number column 503, a warranty expiration date column 504, a total capacity column 505, and a free capacity column 506. Each of those columns displays the drive number 205, the warranty expiration date 206, the total capacity 207, and the free capacity 208 of the drive device information 108, respectively.

The user operates any row of the drive list 502 so as to select the drive device 112 that corresponds to that row. The dotted lines shown in FIG. 5 represent that the drive device 112 whose drive number column 503 is "drive #2" is selected.

In addition, when the data list display button 507 is operated, a drive-by-drive data list window (FIG. 6) for the selected drive device 112 is displayed. Also, when the drive removal button 508 is operated, a drive removal window (FIG. 7) for removing the selected drive device 112 is displayed. Also, when the window close button 509 is operated, the drive list window 501 is closed.

Figure 6:
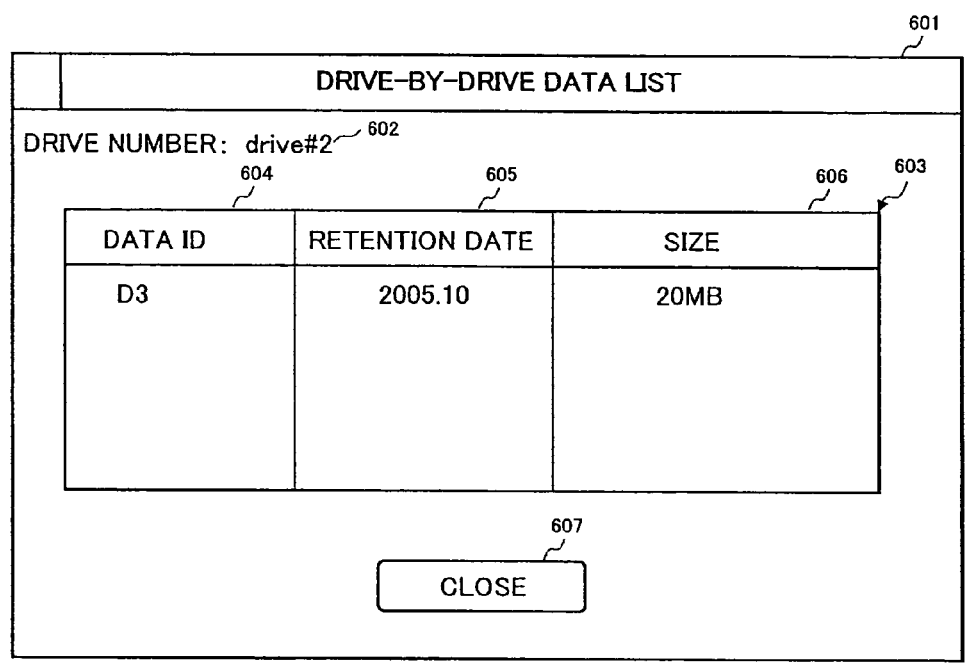
FIG. 6 is an explanatory diagram of a drive-by-drive data list window.

FIG. 6 is an explanatory diagram of a drive-by-drive data list window.

A drive-by-drive data list window 601 displays a drive number 602, a data list 603, and a window close button 607.

The drive number 602 as displayed is the drive number 205 which is selected in the drive list window 501. FIG. 6 displays an example in which a drive "drive #2" is selected in FIG. 5.

The data list 603 is a list of the data that is stored in the drive device 112, and displays the contents of the stored data managing information 109. More particularly, the data list 603 consists of a data ID column 604, a retention date column 605, and a size column 606. Those columns display the data ID 209, the retention date 211, and the data size 212 of the stored data managing information 109 in which the data stored in the disk drive 114 is recorded.

When the window close button 607 is operated, the drive-by-drive data list window is closed.

Figure 7:
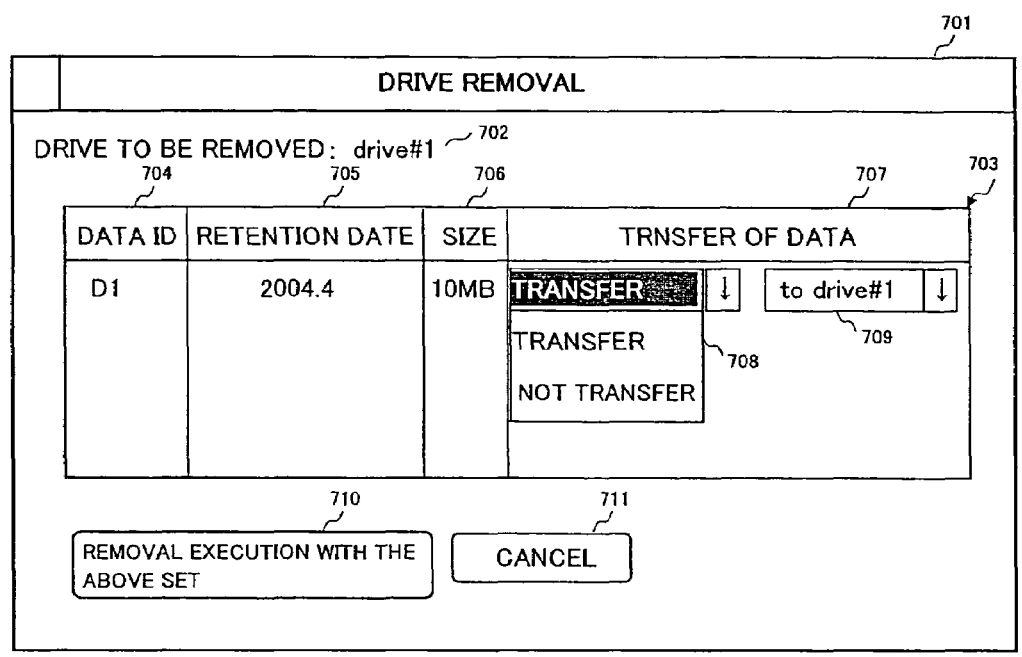
FIG. 7 is an explanatory diagram of a drive removal window.

FIG. 7 is an explanatory diagram of a drive removal window.

A drive removal window 701 displays a drive to be removed 702, a data list 703, an execution button 710, and a cancel button 711.

The drive number 702 as displayed is a drive number 205 which is selected as being removed in the drive list window 501. FIG. 7 shows an example in which the drive "drive #1" is selected in FIG. 5.

The data list 703 is a list of the data which is stored in the drive device 112 and consists of a data ID column 704, a retention date column 705, a size column 706, and a data transfer column 707. The data ID column 704, the retention date column 705, and the size column 706 display the data ID 209, the retention date 211, and the data size 212 of the stored data managing information 109 in which the data stored in the drive device 112 is recorded. The data transfer column 707 displays a transfer necessity select column 708 and a transferred drive select column 709.

The transfer necessity select column 708 is used for selecting whether the data corresponding to the row is transferred to another disk drive 114. When the user operates an arrow at the right side of that column, a pull down menu appears to allow the user to select any one of "transfer" and "not transfer". The default value of that column (a value that is displayed before the user conducts the selection) is "transfer" with respect to the data that has not passed over the retention date 211 and "not transfer" with respect to other data.

The transferred drive select column 709 is used to select the disk drive 114 to which the "transfer" selected data is to be transferred. A pull down menu can be applied for this column as with the transfer necessity select column. The default value of this column is a drive number which is selected in the procedure shown in FIG. 3.

When the execution button 710 is operated, the transfer of the respective data of the drive is executed according to the selection in the data transfer column 707, and the drive can be removed.

When the cancel button 711 is operated, the transfer of the data is not executed and the drive removal window 701 is closed.

According to the first embodiment of the present invention, since the data that is long in retention date is stored in the drive device that is long in warranty expiration date, the amount of data which is transferred when the warranty expiration date is expired and the disk drive is removed is reduced, and a period of time necessary for the removing process of the disk drive can be reduced.

Figure 8:
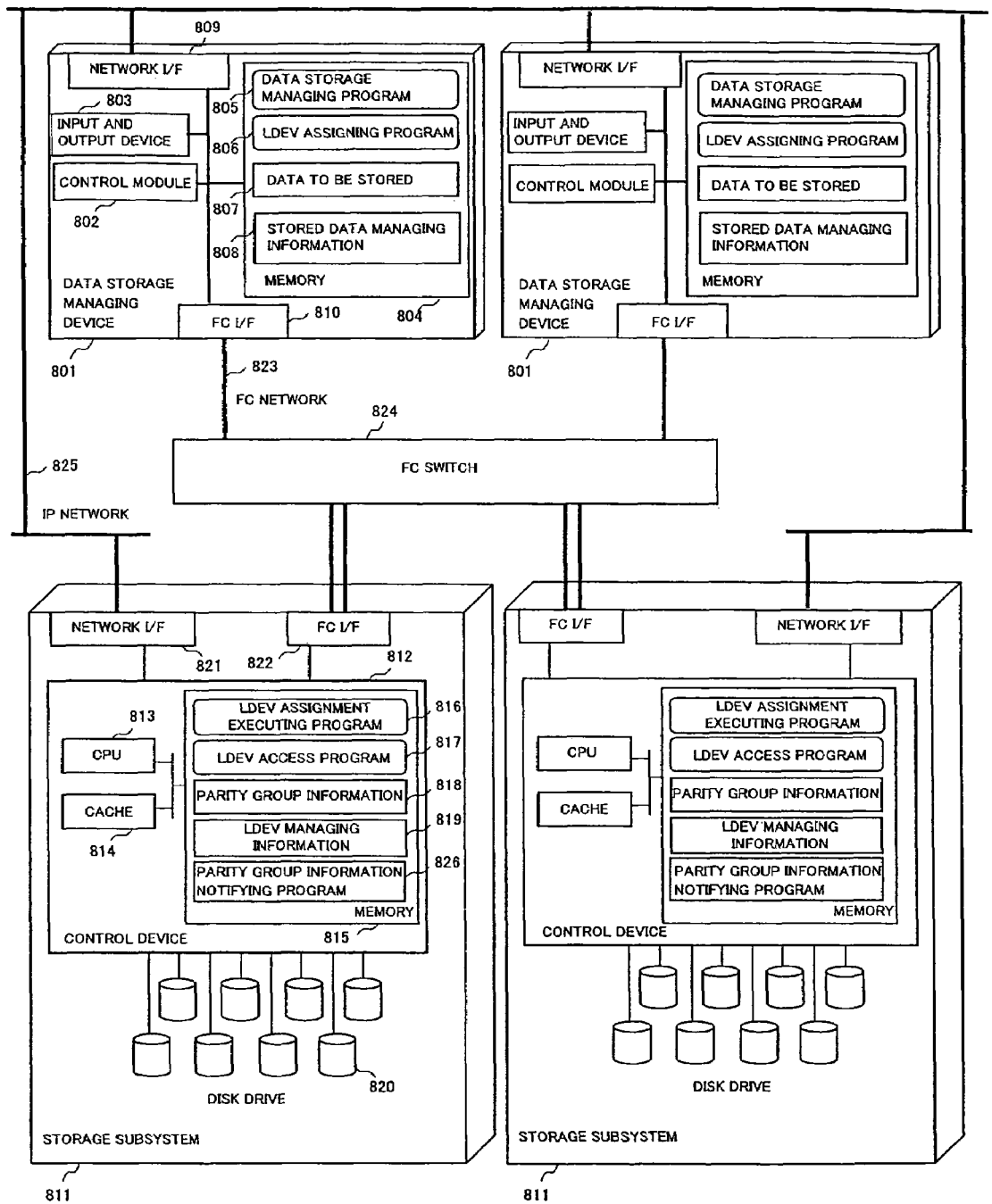
FIG. 8 is a block diagram of a storage system according to a second embodiment of the present invention.

FIG. 8 is a block diagram showing a storage system according to a second embodiment of the present invention.

The second embodiment according to the present invention is different from the fist embodiment in that a disk array device (storage subsystem) is used instead of the drive device. In this embodiment, parts common to those in the first embodiment will be omitted from a detailed description of this embodiment.

The storage system shown in FIG. 8 is made up of a data storage managing device 801, a storage subsystem 811, a Fibre Channel (FC) network 823 that connects those elements to each other, and an FC switch 824.

The data storage managing device 801 includes: a control module (CPU) 802 that executes various programs which are recorded in a memory 804; an input and output device 803 that is used by a user to input and output information; the memory 804 that records various programs, data, and information; an FC interface (I/F) 810 that controls communication with the storage subsystem 811; and a network interface (I/F) 809 that controls communication which is conducted with the storage subsystem 811 and another computer (not shown) through an IP network 825.

The memory 804 records a data storage managing program 805, a logical unit (LDEV) assigning program 806, a data to be stored 807, and a stored data managing information 808. Those elements will be described in detail with reference to FIGS. 10, 12, and 13. Also, the logical unit will be described in detail with reference to FIG. 9.

The storage subsystem 811 is made up of a disk drive 820, a network interface (I/F) 821 that controls communication which is conducted with another computer including the data storage managing device 801 through the IP network 825, an FC interface (I/F) 822 that controls communication with the data storage managing device 801, and a control device 812 that controls those elements.

The storage subsystem 811 includes a plurality of disk drives 820, structures a disk array (RAID: redundant arrays of inexpensive disks), and stores the data to be stored 807.

The control device 812 is made up of a CPU 813 that executes various programs which are recorded in the memory 815, a cache 814 that temporarily records the data to be written in the disk drive 820 and the data which is read from the disk drive 820, and a memory 815 in which various programs, data, and information are recorded.

The memory 815 records a logical unit assignment executing program 816, a logical unit access program 817, a parity group information notifying program 826, a parity group information 818, and a logical unit managing information 819. Those elements will be described in detail with reference to FIGS. 11, 12, 14, and 15. Also, the parity group will be described in detail with reference to FIG. 9.

The FC network 823 is a network that connects the data storage managing device 801 and the storage subsystem 811 through an optical fiber or a metal cable, and conducts the data communication by a Fibre Channel protocol.

The FC switch 824 is a switch that changes over the connection of the FC network 823. A storage area network (SAN) is structured by the FC switch 824 so that the data storage managing device 801 or the storage subsystem 811 can be readily increased or decreased in number.

The data storage managing device 801 and the storage subsystem 811 are connected mutually through the storage area network (SAN), thereby being capable of commonly using the data and the hardware resource.

Figure 9:
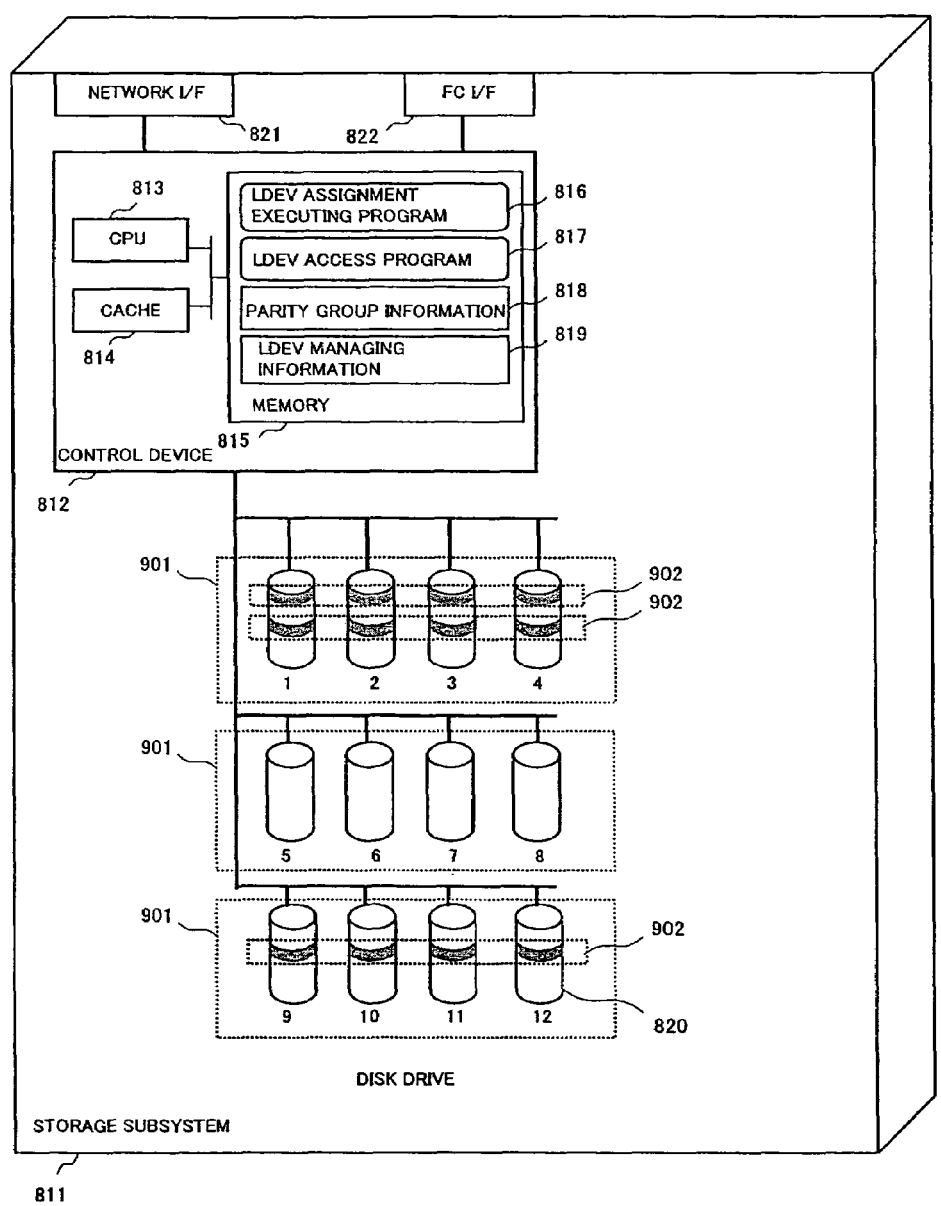
FIG. 9 is an explanatory diagram of a parity group and a logical unit.

FIG. 9 is an explanatory diagram showing a parity group and a logical unit (LDEV).

Every given number of disk drives 820 of the storage subsystem 811 form one parity group 901. The parity group 901 is a unit that structures RAID. For example, when a RAID level 5 is applied, even if a failure occurs in one of the disk drives 820 that structure one parity group 901, the data in the disk drive 820 that breaks down is restored from the data in the remaining disk drives 820, thereby making it possible to prevent the disappearance of the data. In an example shown in FIG. 9, four disk drives 820 form one parity group.

The logical unit 902 is described as LDEV in the figure. The logical unit 902 is a region on the disk drive 820 and is physically scattered in a plurality of disk drives 820. However, the logical unit 902 can be logically regarded as one region. In the example shown in FIG. 9, because RAID is applied, the region of one logical unit 902 is uniformly dispersed in the disk drive 820 that structures one parity group 901. The logical unit assigning program 806 can assign the logical unit 902 of an arbitrary capacity to the free region of the arbitrary parity group 901.

Figure 10A:
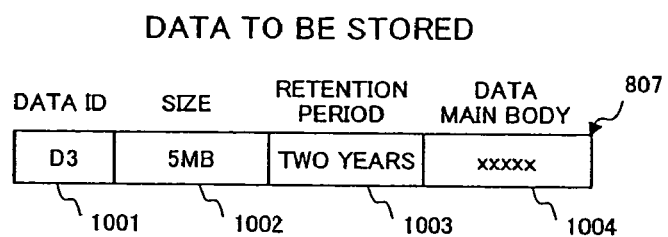

FIGS. 10A and 10B are explanatory diagrams of the data and the like which are recorded in the memory 804 of the data storage managing device 801 according to this embodiment.

FIG. 10A is an explanatory diagram showing the data to be stored 807.

The data to be stored 807 is data that is temporarily recorded in the memory 804, and consists of a data ID 1001, a data size 1002, a retention period 1003, and a data main body 1004.

The data ID 1001 is an identifier which is assigned to identify the data stored in the storage subsystem 811, and is uniquely determined in the storage subsystem 811 which is managed by the data storage managing device 801.

The data size 1002 is the data size of the data to be stored 807, and 5 MB in the example shown in FIGS. 10A and 10B.

The retention period 1003 is a term during which the data has to be stored after the data has been recorded in the storage subsystem 811. In the example shown in FIGS. 10A and 10B, the retention period is two years.

The data main body 1004 is data that is prepared by another computer (not shown) which is connected to the IP network 825, and that is obtained to be stored in the storage subsystem 811 by the data storage managing program 805. The data main body 1004 is a file such as a document or an E-mail. Also, the data main body 1004 may be that another computer requires the data storage managing device 801 that the data be stored in the storage subsystem 811.

FIG. 10B is an explanatory diagram of the stored data managing information 808.

The stored data managing information 808 is prepared by the data storage managing program 805, and consists of a data ID 1005, a storage logical unit 1006, a retention date 1007, and a data size 1008.

The data ID 1005 is an identifier that is assigned to identify the data which are recorded in the storage subsystem 811, and the data ID 1001 which has been explained with reference to FIG. 10A is recorded as it is.

The storage logical unit 1006 is the number of the logical unit 902 in which the data is stored.

The retention date 1007 is a term during which the data has to be stored in the storage subsystem 811, and a time point at which the retention period 1003 elapses from the storage start time of the data.

The data size 1008 is the data size of the data to be stored 807, and the data size 1002 which has been explained with reference to FIG. 10A is recorded as it is.

FIGS. 11A and 11B are explanatory diagrams of the data and so on which are recorded in the memory 815 of the storage subsystem 811 according to this embodiment.

FIG. 11A is an explanatory diagram of the parity group information 818.

The parity group information 818 consists of a parity group number 1101, a warranty expiration date 1102, a total capacity 1103, a free capacity 1104, and a disk drive number 1105, and is disposed for each of the parity groups 901.

The parity group number 1101 is an identifier that is uniquely assigned to identify the parity groups 901 which are formed within the storage subsystem 811.

The warranty expiration date 1102 is a warranty expiration date of each of the parity groups 901. The warranty expiration date 1102 of one parity group 901 is equal to the earliest warranty expiration date among the warranty expiration dates of the disk drives 820 that structure the parity group 901. The warranty expiration date of the disk drive 820 is determined according to a warranty period which is determined by a manufacturer, application conditions of the disk drives 820, and so on. It is necessary that the disk drive 820 of the parity group 901 that has passed over the warranty expiration date 1102 be rapidly removed and replaced with a new disk drive 820.

The total capacity 1103 is the total amount of data which can be stored in the parity group 901.

The free capacity 1104 is the capacity of an unused data storage region of the parity group 901, and is a value obtained by subtracting the amount of data that has been already stored in the parity group 901 from the total capacity 1103.

The parity group information 818 is initialized by the user when the disk drive 820 is introduced into the storage subsystem 811. Then, the parity group information 818 is referred to by the logical unit assigning program 806. Also, it is possible that the manufacturer of each of the disk drives 820 records the information including the warranty period, capacity, and so on of the disk drive 820 in a ROM or the like (not shown) within each of the disk drives 820 at the time of factory shipment, the data storage managing program 805 and so on read the information and set the warranty expiration date 1102 and the total capacity 1103 on the basis of the read information.

The disk drive number 1105 is an identification number of the disk drive 820 that structures the parity group 901. The number is uniquely assigned to the disk drive 820 in one storage subsystem 811.

FIG. 11B is an explanatory diagram of a logical unit managing information 819.

The logical unit managing information 819 is made up of a logical unit number 1106, an assignment parity group 1107, and an assignment capacity 1108.

The logical unit number 1106 is an identifier that is uniquely assigned to identify the logical units 902 which are formed within the storage subsystem 811.

The assignment parity group 1107 is the parity group number 1101 of the parity group 901 to which the logical unit 902 is assigned.

The assignment capacity 1108 is the data capacity that is assigned to the logical unit 902.

Figure 12:
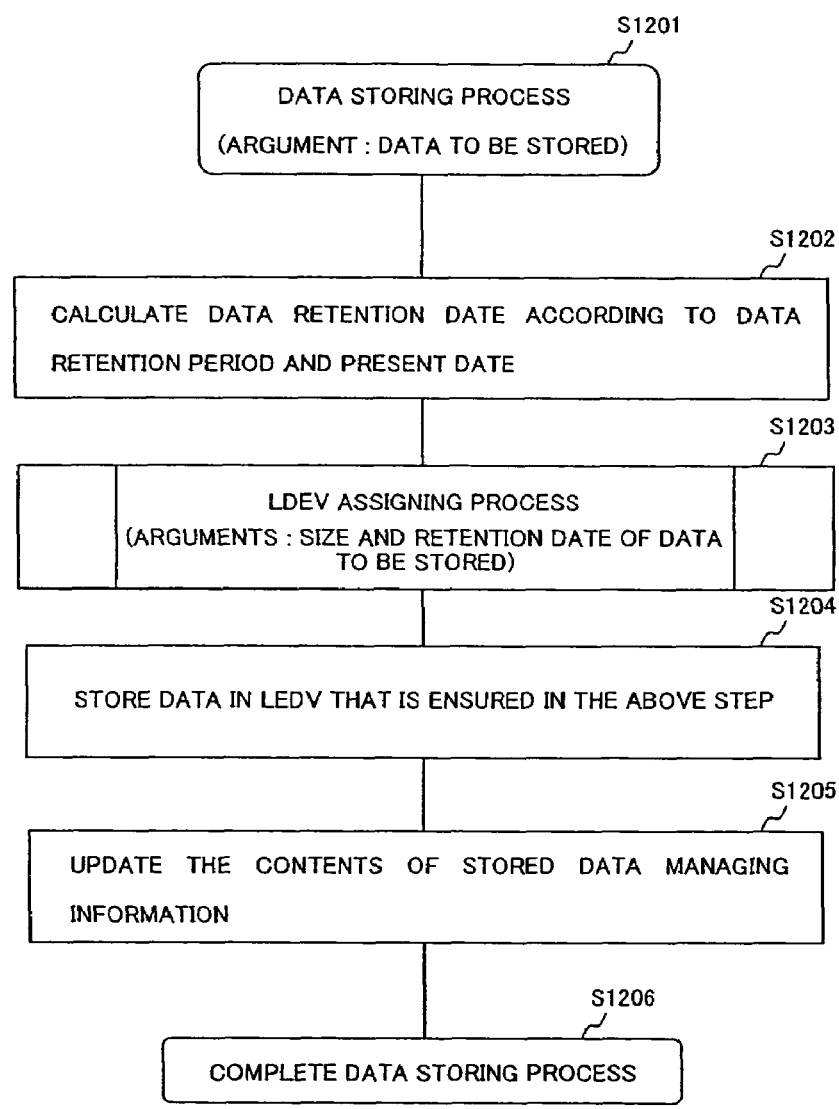
FIG. 12 is a flowchart of a data storing process which is executed by the data storage managing program.

FIG. 12 is a flowchart of the data storing process which is executed by the data storage managing program 805.

The data storage managing program 805 is a prograrft that manages the storage of the data in the storage subsystem 811, and is executed by the control module 802. The data storage managing program 805 obtains the data to be stored in the storage subsystem 811 from another computer (not shown) through the IP network 825, and records the obtained data in the memory 804 as the data to be stored 807. Also, the data storage managing program 805 stores the data to be stored 107 in the logical unit which is assigned by the logical unit assigning program 806.

When a data storage request is received with the data to be stored 807 as an argument, the data storing process starts (S1201). Then, the retention date 1007 is calculated according to the retention period 1003 of the data and the present date (S1202).

Then, the logical unit assigning program 806 is indicated to execute the logical unit assigning process with the data size 1002 and the retention date 1007 of the data to be stored 807 as the arguments (S1203). This processing will be described with reference to FIG. 13.

Then, the data to be stored 807 is stored in the logical unit 902 that is assigned in S1203 (S1204). More particularly, the logical unit access program 817 of the storage subsystem 811 is indicated to store the data to be stored 807.

The logical unit access program 817 is a program that is executed by the CPU 813, and the data to be stored 807 is stored in the designated logical unit of the disk drive 820 according to an indication of the data storage managing program 805 (S1204).

Also, the indication is transmitted to the control device 812 of the storage subsystem 811 through the FC network 823 and the FC switch 824, but may be transmitted through the IP network 825.

Then, update that the information on newly stored data is added to the stored data managing information 808 is made (S1205), and the data storing process is completed (S1206).

Figure 13:
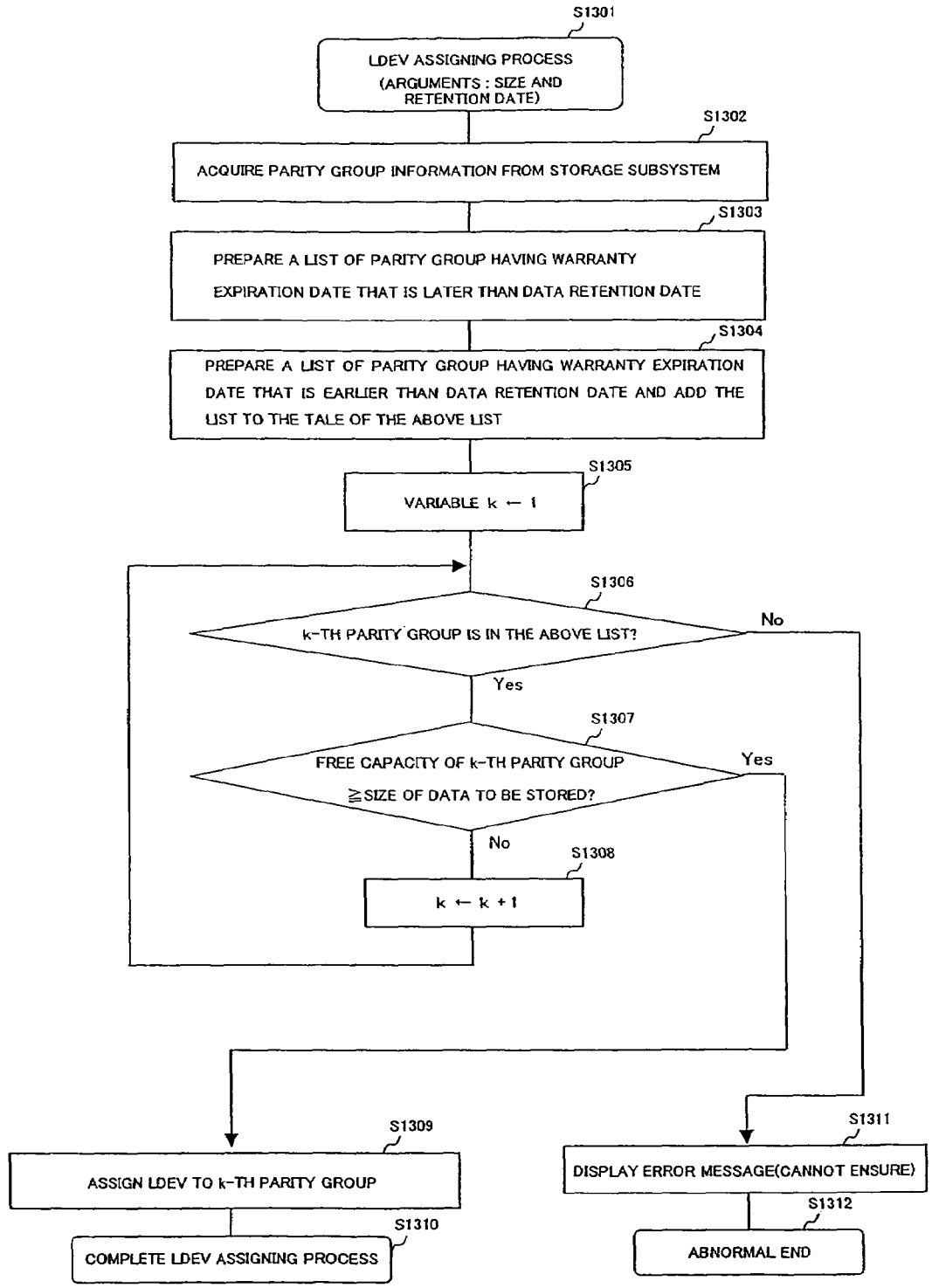
FIG. 13 is a flowchart of a logical unit assigning process which is executed by a logical unit assigning program.

FIG. 13 is a flowchart of the logical unit assigning process which is executed by the logical unit assigning program 806 in the step S1203.

The logical unit assigning program 806 is a program which is executed by the control module 802, and designates the parity group that stores the data to be stored 807.

When the logical unit assignment request is received with the data size 1002 and the retention date 1007 of the data to be stored 807 as the arguments, the logical unit assigning process starts (S1301). Then, the parity group information 818 of the storage subsystem 811 that stores the data is acquired (S1302). The acquirement is conducted when the parity group information notification request is issued at the storage subsystem 811 side, and the result is received (refer to FIG. 15). The issue of the request and the reception of the result interact with the control device 812 of the storage subsystem 811 through the FC network 823 and the FC switch 824, but may be conducted through the IP network 825.

Then, the parity group 901 having the warranty expiration date 1102 that is later than the retention date 1007 is selected from the acquired parity group information 818 to specify the parity group number 1101. A list in which the specified parity group numbers 1101 are arranged in the order that the warranty expiration dates 1102 are earlier is prepared (S1303). In addition, in the remaining parity groups 901 (the parity groups 901 each having the warranty expiration date 1102 that is earlier than the retention date 1007), a list in which the specified parity group numbers 1101 are arranged in the order that the warranty expiration dates 1102 are later is prepared, and the list is added to the tale of the list that is prepared in the step S1303 (S1304).

Then, an initialization is conducted with the value of a variable k as 1 (S1305). In this example, the variable k is a counter which is used to sequentially read the information in the lists prepared in the steps S1303 and S1304.

Then, the parity group number 1101 which is k-th from the head of the list is searched (S1306). In the case where the k-th parity group number 1101 is not found, the parity group 901 that is to store the data does not exist. Consequently, an error message that is indicative of no parity group in which the data is to be stored is displayed (S1311) to abnormally end this process without storing the data (S1312).

On the other hand, in the case where the k-th parity group number 1101 is found, the free capacity 1104 that corresponds to the parity group number 1101 is searched from the parity group information 818, and is compared with the data size 1002 of the data to be stored 807 (S1307). In the case where the free capacity 1104 is smaller than the data size 1002, the data to be stored 807 cannot be stored in the parity group 901. Consequently, the variable k is incremented by one (S1308), and processing returns to the step S1306 for searching the subsequent parity group.

On the other hand, in the case where the free capacity 1104 is larger than the data size 1002 or equal to the data size 1002, the data can be stored in the k-th parity group 901. Consequently, the logical unit. 902 for storing the data to be stored 807 is assigned to the parity group 901. More specifically, the execution of the logical unit assignment executing program 816 is indicated with the data size 1002 and the parity group number 1101 of the data to be stored 807 as the arguments (S1309). The processing of the logical unit assignment executing program 816 will be described with reference to FIG. 14.

This indication is transmitted to the control device 812 of the storage subsystem 811 through the FC network 823 and the FC switch 824, but may be transmitted through the IP network 825.

With the above procedure, the logical unit assigning process is completed (S1310).

In FIG. 13, the warranty expiration date 1102 is set and the logical unit 902 is assigned for each of the parity groups 901. However, it is possible that the warranty expiration date be set and the logical unit 902 be assigned for each of the storage subsystems 811. In this case, the warranty expiration date of the storage subsystem 811 is equal to the earliest warranty expiration date among the warranty expiration dates of the disk drives 820 that structure the storage subsystem 811.

Figure 14:
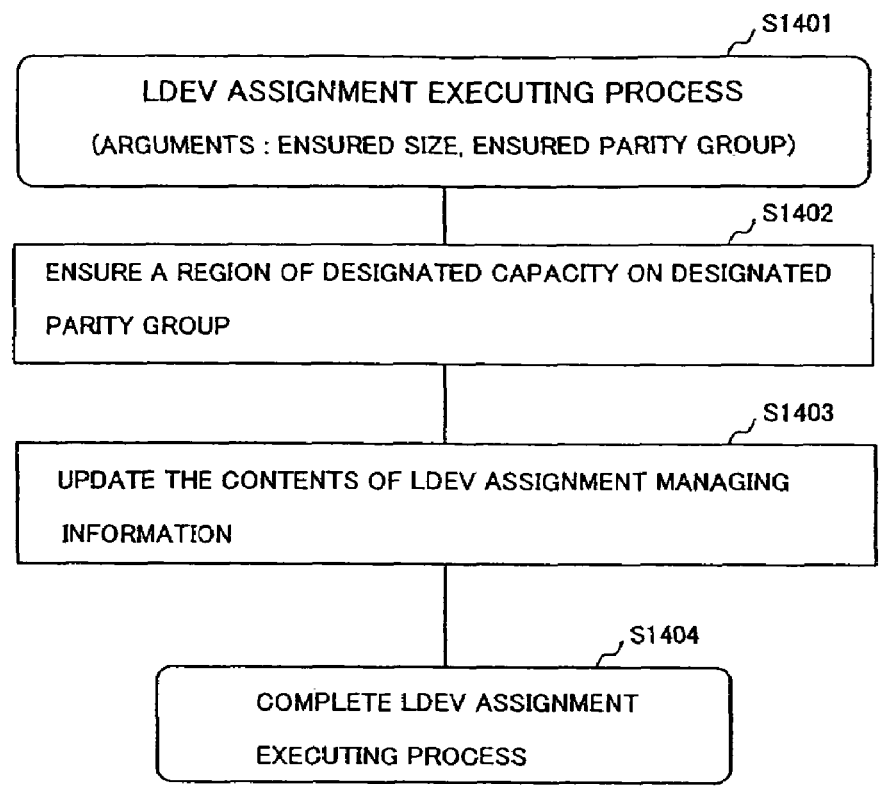
FIG. 14 is a flowchart of a logical unit assignment executing process which is executed by a logical unit assignment executing program.

FIG. 14 is a flowchart of the logical unit assignment executing process which is executed by the logical unit assignment executing program 816 in the step S1309.

The logical unit assignment executing program 816 is a program that is executed by the CPU 813, and assigns the logical unit of the designated capacity to the parity group which is designated by the logical unit assigning program 806.

When the logical unit assignment execution request is received with the data size 1002 of the data to be stored 807 and the parity group number 1101 that stores the data to be stored 807 as the arguments, the logical unit assignment executing-process starts (S1401). Then, the logical unit 902 of the data size 1002 is newly assigned to the parity group 901 of that number (S1402).

Then, update that the information on the logical unit that is newly assigned to is added to the logical unit managing information 819 is made (S1403), and the processing is completed (S1404).

Figure 15:
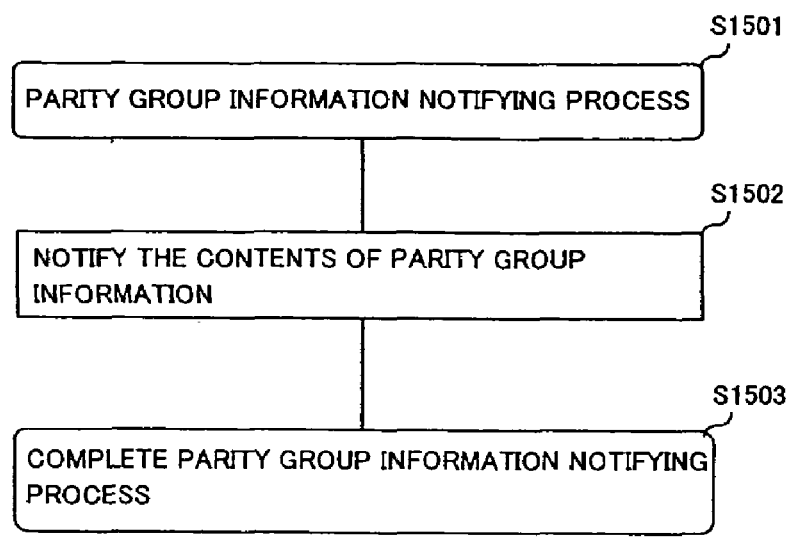
FIG. 15 is a flowchart of a parity group information notifying process which is executed by a parity group information notifying program.

FIG. 15 is a flowchart of the parity group information notifying process which is executed by the parity group information notifying program 826 in the step S1302 of FIG. 13.

The parity group information notifying program 826 is a program which is executed by the CPU 813, and notifies the logical unit assigning program 806 of the contents of the parity group information 818.

When the parity group information notification request which is issued from the data storage managing device 801 is received, the parity group information notify process starts (S1501). Then, what issues the parity group information request is notified of the contents of the parity group information 818 (S1502), and the processing is completed (S1503).

According to the processing shown in FIGS. 12 to 14, the parity group 901 having the warranty expiration date 1102 that is later than the retention date 1007 of the data to be stored 807 is selected, and the data to be stored 807 is stored in the selected parity group 901. For that reason, when the warranty expiration date 1102 of the parity group 901 elapses, and the disk drive 820 that structures the parity group 901 is removed, it is unnecessary to transfer the data to be stored 807 to another parity group 901, and the amount of processing can be reduced.

Also, because the parity group 901 having the earliest warranty expiration date 1102 is selected from the parity groups 901 having the warranty expiration dates which are later than the retention date 1007 of the data to be stored 807, and the data to be stored 807 is stored in the selected parity group 901, the parity group 901 having the later warranty expiration date 1102 can be assigned to data to be stored 807 having the later retention date 1007.

Also, in the case where no parity group 901 having the warranty expiration date that is later than the retention date 1007 of the data to be stored 807 is found, the parity group 901 having the latest warranty expiration date is selected. Consequently, it is possible to reduce the transfer of the data necessary for removing the disk drive 820 of the parity group 901.

According to the second embodiment of the present invention, since the data having the later retention date is stored in the parity group having the later warranty expiration date, the amount of data that is transferred when the warranty expiration date elapses and the parity group is removed is reduced, thereby making it possible to reduce a period of time necessary for the disk drive removing process.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, comprising:
a data storage managing device that manages storage of data which is acquired from another computer through a network; and
a storage subsystem including a plurality of disk drives that structure a plurality of parity groups, and a parity group information holding area that holds a warranty expiration date set to the parity groups to which a logical unit is set,
wherein the data storage managing device includes a data storage managing module that indicates the storage of data, and a logical unit assigning module that assigns a logical unit that stores the data,
wherein the data storage managing module calculates a retention date of the data and requests assignment of the logical unit that stores the data,
wherein, upon receiving the assignment request indication of the logical unit, the logical unit assigning module judges whether a logical unit having a free capacity that is equal to or larger than a size of the data to be stored exists in the parity group having the warranty expiration date that is later than the retention date of the data to be stored,
when logical units each satisfying the above conditions exist, the logical unit of the parity group having the earliest warranty expiration date among the logical units each satisfying the above conditions is assigned, and
when no logical unit that satisfies the above conditions exists, the logical unit of the parity group having the latest warranty expiration date among the logical units each having a free capacity that is equal to or larger than the size of the data to be stored is assigned,
wherein the data storage managing module indicates the logical unit that is assigned by the logical unit assigning module to store the data, and
wherein the storage subsystem comprises a logical unit assignment executing module that ensures a region that stores the data in the logical unit that is assigned by the logical unit assigning module, and a logical unit access module that stores the data in the ensured region on the basis of the storage indication of the data.

2. A storage system, comprising:
a storage device having a plurality of disk drives that stores data; and
a data storage managing device which is connected to the storage device and has a data storage managing module that manages the storage of the data in the storage device,
wherein the data storage managing module compares a retention date of the data to be stored with a warranty expiration date of the disk drive, selects a disk drive that stores the data as the result of the comparison, and stores the data in the selected disk drive.

3. The storage system according to claim 2, wherein the data storage managing module selects a disk drive having a warranty expiration date that is later than the retention date of the data to be stored and having a free capacity that is equal to or larger than a size of the data to be stored.

4. The storage system according to claim 3, wherein the data storage managing module requests of the storage device to transmit the storage device information including information on the warranty expiration date, and wherein the storage device includes a storage device information notifying module that transmits the storage device information to the data storage managing module upon receiving the request.

5. The storage system according to claim 2, wherein the data storage managing module judges whether there exists a disk drive having a warranty expiration date that is later than the retention date of the data to be stored and having a free capacity that is equal to or larger than the size of the data to be stored,
when disk drives each satisfying the above conditions exist, the data storage managing module selects a disk drive having the earliest warranty expiration date among the disk drives each satisfying the above conditions.

6. The storage system according to claim 2, wherein the data storage managing module judges whether there exists a disk drive having a warranty expiration date that is later than the retention date of the data to be stored and having a free capacity that is equal to or larger than the size of the data to be stored, and
when no disk drive that satisfies the above conditions exists, the data storage managing module selects a disk drive having the latest warranty expiration date among the disk drives each having a free capacity that is equal to or larger than the size of the data to be stored.

7. The storage system according to claim 6, wherein the data storage managing module deletes data that passes over the retention date among the data that is stored in the disk drives each having the warranty expiration date that is later than the retention date of the data to be stored and having the free capacity that is smaller than the size of the data to be stored from the disk drive.

8. The storage system according to claim 7, wherein the data storage managing module deletes the data that has passed over the retention date from the disk drive in a case where the free capacity of the disk drive is equal to or larger than the size of the data to be stored when the data that has passed over the retention date is deleted.

9. The storage system according to claim 2, wherein the data storage managing module compares the retention date of the data stored in a first disk drive that does not pass over the retention date among the data that is stored in the first disk drive with the warranty expiration dates of the plurality of disk drives except the first disk drive among the plurality of disk drives, selects a second disk drive to store the data as a result of the comparison, copies the data to the selected second disk drive, and judges that removal of the first disk drive is enabled, upon completion of copying the data.

10. The storage system according to claim 9, wherein the data storage managing module selects a disk drive having a warranty expiration date that is later than the retention date of the data to be stored and having a free capacity that is equal to or larger than the size of the data to be stored as the second disk drive to which the data is to be copied.

11. The storage system according to claim 9, wherein the data storage managing module judges whether there exists a disk drive having a warranty expiration date that is later than the retention date of the data to be stored and having a free capacity that is equal to or larger than the size of the data to be stored,
when disk drives each satisfying the above conditions exist, the data storage managing module selects a disk drive having the earliest warranty expiration date among the disk drives each satisfying the above conditions as the second disk drive, and when no disk drive that satisfies the above conditions exists, the data storage managing module selects a disk drive having the latest warranty expiration date among the disk drives each having a free capacity that is equal to or larger than the size of the data to be stored as the second disk drive.

12. The storage system according to claim 11, wherein the data storage managing module deletes the data that has passed over the retention date from the disk drive in a case where the free capacity of the disk drive is equal to or larger than the size of the data to be stored when the data that has passed over the retention date is deleted, in the disk drives each having a warranty expiration date that is later than the retention date of the data to be stored and having a free capacity that is smaller than the size of the data to be stored.

13. A storage system, comprising:
a storage device having a plurality of disk drives that structure a plurality of parity groups to which a logical unit is assigned;
a data storage managing device which is connected to the storage device and has a data storage managing module that manages storage of the data in the storage device; and
a parity group information holding area that holds a parity group information including a warranty expiration date that is set to each of the parity groups,
wherein the data storage managing module compares a retention date of the data to be stored with the warranty expiration dates of the parity groups, assigns the logical unit that stores the data as the result of the comparison, and stores the data in the assigned logical unit.

14. The storage system according to claim 13, wherein the data storage managing module assigns the logical unit having a capacity that is equal to or larger than the size of the data to be stored to the parity group having a warranty expiration date that is later than the retention date of the data to be stored.

15. The storage system according to claim 14, wherein the data storage managing module requests of the storage device to transmit the parity group information, and
wherein the storage device includes a parity group information notifying module that transmits the parity group information to the data storage managing module, upon receiving the request.

16. The storage system according to claim 13, wherein the data storage managing module judges whether there exists a parity group having a warranty expiration date that is later than the retention date of the data to be stored and having a free capacity that is equal to or larger than the size of the data to be stored,
when parity groups each satisfying the above conditions exist, the data storage managing module assigns the logical unit to a parity group having the earliest warranty expiration date among the parity groups each satisfying the above conditions, and
when no parity group that satisfies the above conditions exists, the data storage managing module assigns the logical unit to the parity group having the latest warranty expiration date among the parity groups each having a free capacity that is equal to or larger than the size of the data to be stored.

17. A data storage managing device, comprising:
an interface that is connected to an external storage device having a plurality of disk drives that store data through a network; and
a control module that is connected to the interface,
wherein the control module judges whether there exists a disk drive having a warranty expiration date that is later than a retention date of the data to be stored and having a free capacity that is equal to or larger than a size of the data to be stored,
when disk drives each satisfying the above conditions exist, the control module selects a disk drive having the earliest warranty expiration date among the disk drives each satisfying the above conditions, and
when no disk drive that satisfies the above conditions exists, the control module selects a disk drive having the latest warranty expiration date among the disk drives each having a free capacity that is equal to or larger than the size of the data to be stored.

18. A data storage managing device, comprising:
an interface connected through a network to an external storage device which has a plurality of disk drives which structure a plurality of parity groups and stores data, and in which a logical unit is set to the parity groups; and
a control module that is connected to the interface;
wherein the control device judges whether there exists a parity group having a warranty expiration date that is later than a retention date of the data to be stored and having a free capacity that is equal to or larger than a size of the data to be stored,
when parity groups each satisfying the above conditions exist, the control module assigns the logical unit to a parity group having the earliest warranty expiration date among the parity groups each satisfying the above conditions, and
when no parity group that satisfies the above conditions exists, the control module assigns the logical unit to a parity group having the latest warranty expiration date among the parity groups each having a free capacity that is equal to or larger than the size of the data to be stored.

19. A computer program product that is executed in a data storage managing device for managing a storage system,
wherein the data storage managing device is connected to a storage device having a plurality of disk drives that store data and which has a data storage that managing module that manages storage of the data in the storage device,
the program controlling the data storage managing device to:
compare a warranty expiration date of the disk drive with a retention date of the data to be stored;
compare a free capacity of the disk drive with a size of the data to be stored;
judge whether there exists a disk drive having a warranty expiration date that is later than the retention date of the data to be stored and having a free capacity that is equal to or larger than the size of the data to be stored,
when disk drives each satisfying the above conditions exist, select a disk drive having the earliest warranty expiration date among the disk drives each satisfying the above conditions, and
when no disk drive that satisfies the above conditions exists, select a disk drive having the latest warranty expiration date among the disk drives each having a free capacity that is equal to or larger than the size of the data to be stored.

20. A computer program product that is executed in a data storage managing device for managing a storage system, wherein the data storage managing device is connected to a storage device which has a plurality of disk drives which structure a plurality of parity groups and in which a logical unit is set to the parity groups and which comprises: a data storage managing module that manages the storage of the data in the storage device; and a parity group information holding area that holds a warranty expiration date that is set to each of the parity groups, the program controlling the data storage managing device to:

compare the warranty expiration date of the parity group with a retention date of the data to be stored;

compare a free capacity of the logical unit that is set to the parity groups with a size of the data to be stored;

judge whether there exists a parity group having a warranty expiration date that is later than the retention date of the data to be stored and having a free capacity that is equal to or larger than the size of the data to be stored, when parity groups each satisfying the above conditions exist, assign the logical unit to a parity group having the earliest warranty expiration date among the parity groups each satisfying the above conditions, and when no parity group that satisfies the above conditions exists, assign the logical unit to a parity group having the latest warranty expiration date among the parity groups each having a free capacity that is equal to or larger than the size of the data to be stored.

* * * * *